(12) United States Patent
Fukuta et al.

(10) Patent No.: US 8,353,130 B2
(45) Date of Patent: Jan. 15, 2013

(54) DOOR WEATHER STRIP

(75) Inventors: Masahito Fukuta, Kiyosu (JP); Tatsushi Goto, Kiyosu (JP); Masatoshi Hotta, Kiyosu (JP); Takaaki Sato, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/064,119

(22) Filed: Mar. 7, 2011

(65) Prior Publication Data

US 2011/0219701 A1 Sep. 15, 2011

(30) Foreign Application Priority Data

Mar. 9, 2010 (JP) ................. P.2010-051272

(51) Int. Cl.
*B60J 10/08* (2006.01)
(52) U.S. Cl. ...................... 49/498.1; 49/493.1
(58) Field of Classification Search .............. 49/440, 49/441, 475.1, 495.1, 498.1
See application file for complete search history.

(56) References Cited

U.S. PATENT DOCUMENTS

| | | | |
|---|---|---|---|
| 5,973,017 A | 10/1999 | Okita et al. | |
| 6,132,847 A | 10/2000 | Okita et al. | |
| 6,499,256 B1* | 12/2002 | Aritake et al. | 49/441 |
| 6,632,918 B1* | 10/2003 | Matsushita et al. | 528/481 |
| 6,686,020 B2* | 2/2004 | Sakuma | 428/122 |
| 6,777,453 B1* | 8/2004 | Matsushita et al. | 521/45 |
| 7,077,450 B2* | 7/2006 | Kohara et al. | 296/39.3 |
| 2004/0221514 A1* | 11/2004 | Kohara et al. | 49/475.1 |
| 2007/0084127 A1* | 4/2007 | Muraoka et al. | 49/490.1 |
| 2008/0110102 A1* | 5/2008 | Hotta et al. | 49/498.1 |
| 2008/0148646 A1* | 6/2008 | Nozaki et al. | 49/490.1 |
| 2009/0100761 A1* | 4/2009 | Hashimoto et al. | 49/475.1 |
| 2009/0120007 A1* | 5/2009 | Aritake et al. | 49/490.1 |
| 2009/0266000 A1* | 10/2009 | Minoura et al. | 49/490.1 |

FOREIGN PATENT DOCUMENTS

| | | |
|---|---|---|
| EP | 1 702 953 A3 | 8/2008 |
| JP | 10-204201 A | 8/1998 |
| JP | 11-193335 A | 7/1999 |
| JP | 2000-313764 A | 11/2000 |
| JP | 2000-344980 A | 12/2000 |
| JP | 2003-182374 A | 7/2003 |
| JP | 2009-096455 A | 5/2009 |

OTHER PUBLICATIONS

British Office Action dated Jun. 27, 2011.

* cited by examiner

*Primary Examiner* — Katherine W Mitchell
*Assistant Examiner* — Justin Rephann
(74) *Attorney, Agent, or Firm* — McGinn IP Law Group, PLLC

(57) ABSTRACT

A door weather strip includes an attaching base part that is attached along an outer periphery of a door frame and a hollow seal part that is extended in an outer peripheral direction of a door from the attaching base part. The attaching base part 11 includes a base bottom part, a vehicle inner side wall part and a vehicle outer side wall part and a partition wall. Both the attaching base part and the seal part are made of the same EPDM sponge rubber material by an extrusion process. The door weather strip satisfies conditions that a specific gravity is 0.36 or higher and 0.44 or lower, a low stretch stress is 200 kPa or higher and 230 kPa or lower and an average foaming cell diameter is 180 μm or larger and 220 μm or smaller.

9 Claims, 3 Drawing Sheets

DOOR WEATHER STRIP

BACKGROUND OF THE INVENTION

1. Field of the Invention

The present invention relates to a door weather strip including an attaching base part fitted to an attachment position of a peripheral edge of a door for a vehicle and a seal part extending in an outer peripheral direction of the door from the attaching base part.

2. Related Art

Ordinarily, a door weather strip is attached to a peripheral edge of a door for a vehicle (an automobile). The door weather strip includes an attaching base part fitted to an attachment position of the peripheral edge of the door and a seal part, integrally formed integrally with the attaching base part and having a hollow part. The seal part of the door weather strip is allowed to come into contact with a peripheral edge of an opening of the door of a vehicle body (an automobile main body) under pressure so that the opening part of the door and the vehicle body are sealed, when the door is closed.

The door weather strip includes the attaching base part and the seal part as described above, however, functions thereof are different depending on parts respectively. Namely, since the attaching base part is a part fitted to the attachment position of the peripheral edge of the door, an attaching form thereof is expected to be held for a long period of time. On the other hand, the hollow seal part is expected to be capable to follow the deformation when the seal part is pressed toward the peripheral edge of the opening of the door of the vehicle body.

However, usually, it has been difficult to realize, so to speak, opposite performances as described above at the same time. On the other and, a technique is proposed that an attaching base part and a seal part are made of different materials (for instance see JP-A-2009-96455.).

In this technique, the attaching base part is made of a sponge rubber material whose specific gravity is 0.2 or higher and lower than 0.45 and whose low stretch stress of 200 kPa or higher, and the seal part is made of a sponge rubber material that has a specific gravity of 0.45 or higher and 1.0 or lower and a low stretch stress of 120 kPa or higher and lower than 200 kPa.

However, in the technique described above, since a rate of the seal part is large and the specific gravity thereof is relatively large, it is hard to say that the technique described above satisfactorily meets recent demand for further weight reduction of door weather strip. Further, in the more technique described above, two extruders are required to be able to combine two kinds of materials together, so that a production device becomes more complicated.

SUMMARY OF THE INVENTION

The present invention is subjected to solve the problems described above and it is an object of the present invention to provide a door weather strip that does not make a production device complicated, can ensure a sufficient performance and can adequately meet a recent demand for a weight reduction.

Now, suitable examples for solving the problems described above will be respectively described below for each of items. Operational effects peculiar to the corresponding examples will be additionally described in accordance with necessity.

Example 1

A door weather strip including
an attaching base part that is fitted to an attachment position of a peripheral edge of a door for a vehicle and
a seal part that is extended in an outer peripheral direction of the door from the attaching base part and allowed, when the door is closed, to come into contact with a peripheral edge of an opening of the door of a vehicle main body under pressure, wherein both the attaching base part and the seal part are made with the same process EPDM sponge rubber material through an extrusion process (ethylene-propylene-diene copolymer), and the door weather strip satisfies conditions that a specific gravity is 0.36 or higher and 0.44 or lower, a low stretch stress is 200 kPa or higher and 230 kPa or lower and an average foaming cell diameter is 180 μm or larger and 220 μm or smaller.

According to the door weather strip of the example 1 described above, since the low stretch stress is 200 kPa or higher, the attaching base part is not unnecessarily much deformed under an attached state, so that the attached state can be stabilized. On the other hand, as for the rigidity of the material of the seal part, since the low stretch stress is 230 kPa or lower, which is not very large, a deformation follow-ability is adequately satisfied when the seal part is pressed to the peripheral edge of the opening of the door under a state that the door is closed. As a result, a sufficient sealing property can be ensured. Here, the "low stretch stress" can be more specifically evaluated by a "low stretch stress" σ 25 (a value obtained by dividing a tension when a prescribed stretch (25%) is given to a test piece by an initial sectional area of the test piece) according to JIS K 6254 (the following the same).

Further, in the example 1, since the specific gravity is 0.44 or lower, the door weather strip can be adequately lightened. When the specific gravity is lower than 0.36, the above-described low stretch stress of 200 kPa or higher is relatively hardly satisfied.

Furthermore, since the average foaming cell diameter is 220 μm or smaller, a surface skin is fine, so that the door weather strip is excellent in its durability and rigidity. On the other hand, when the average foaming cell diameter is smaller than 180 μm, it is relatively difficult to obtain the door weather strip that satisfies the specific gravity of 0.36 and the low stretch stress of 200 kPa or higher.

In the door weather strip of the example 1, both the attaching base part and the seal part are made of the same EPDM sponge rubber material through extrusion process. Accordingly, a production device can be restrained from being complicated and a cost from being increased.

The door weather strip of the example 1 is desirably made of, for instance, two kinds of EPDM polymers as main components. Namely, the two kinds of EPDM polymers include an EPDM polymer of a relatively high molecular weight and an EPDM polymer of a relatively low molecular weight. As the EPDM polymer of the high molecular weight, for instance, a polymer is preferably used which satisfies conditions that a Mooney viscosity ML1+4 (125° C.) is 100 to 180, non-conjugate diene is composed of ethylidene norbornene and dicyclopentadiene, composition ratios thereof are respectively 6 to 12 mass % and 0.5 to 5 mass %, a composition ratio of the non-conjugate diene is 8 to 12 mass % in total and Mw/Mn obtained by a GPC law is 3.0 to 4.0. As the EPDM polymer of the low molecular weight, for instance, a polymer is preferably used which satisfies conditions that a Mooney viscosity ML1+4 (125° C.) is 20 to 60, non-conjugate diene is composed of ethylidene norbornene, a content thereof is 8 to 12 mass % and Mw/Mn obtained by a GPC law is 4.0 to 6.0.

Further, following additives are suitably mixed, in the EPDM polymer of 100 mass parts, such as an inorganic filler of 3 mass parts to 30 mass parts, sulfur of 2.0 mass parts to 3.0 mass parts, OBSH (4,4'-oxybis (benzene sulfonyl hydrazide)) of 3.0 mass parts to 6.0 mass parts, ADCA (azodicarboxylic amide) of 0.4 mass parts to 1.9 mass parts. Both OBSH and ADCA are foaming agents. In this example 1, these two kinds of foaming agents are used together, allowing what is called a two-stage foaming operation to satisfy the characteristics described above, especially specific gravity. Further, in the door weather strip of the example 1, what is called a resin material such as polyethylene that is used as a material of the attaching base part of the above-described JP-A-2009-96455 is desirably not included. Thus, a permanent compression set, what is called, a "permanent set in fatigue" which may be possibly caused by adding a resin can be restrained from being generated and the materials described above can be preferably used as the material of the seal part.

Example 2

A door weather strip according to the example 1, that satisfies a surface roughness RzD (ten point height of irregularities) of 20 μm or higher and 37 μm or lower.

According to the example 2, since the door weather strip satisfies the surface roughness RzD (ten point height of irregularities) of 37 μm or lower, quality deffects such as a water leakage and bleeding can be more assuredly suppressed. The surface roughness RzD (ten point height of irregularities) preferably has a smaller value, however, the foaming operation needs to be reduced or a foaming size needs to be small, when the surface roughness RzD is to be set to a value smaller than 20 μm. In that case, the specific gravity of 0.44 or lower and the average foaming cell diameter of 180 μm or larger are hardly satisfied. Thus, the materials described above cannot be used as materials of the seal part that realize a prescribed rigidity, satisfy a demand for weight reduction with a fine surface skin.

According to the present invention, the door weather strip can be obtained that does not make a production device complicated, can ensure a sufficient performance and can adequately meet a recent demand for weight reduction.

DETAILED DESCRIPTION OF THE PREFERRED EMBODIMENT

Figure 1:
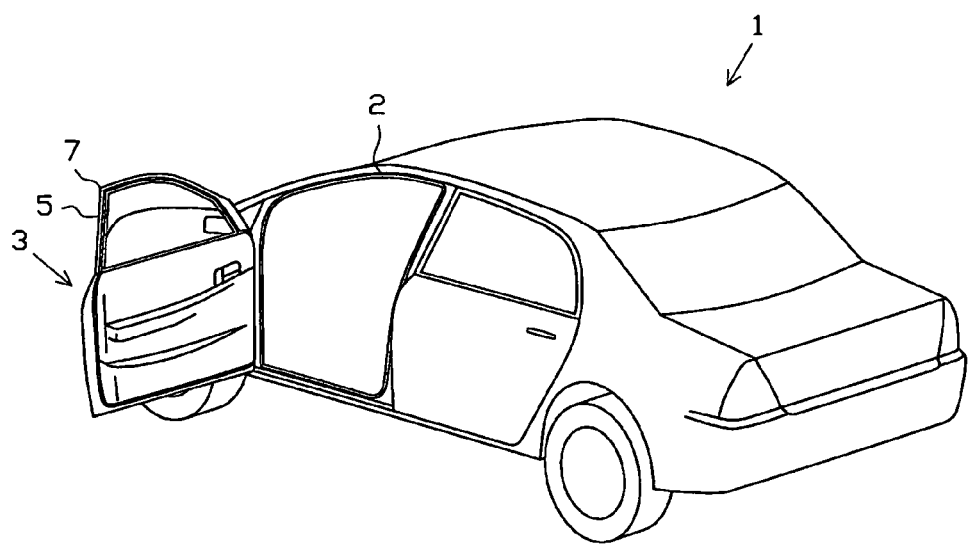
FIG. 1 is a perspective view schematically showing an automobile in one exemplary embodiment.

Now, one exemplary embodiment will be described below by referring to the drawings. As shown in FIG. 1, in a door opening 2 formed in a vehicle body of an automobile 1 as a vehicle, an automobile door (in the drawing, a front door: refer it to simply as a "door 3", hereinafter) is provided so as be opened and closed. A door weather strip 5 is attached to a peripheral edge part of the door 3. The door weather strip 5 includes one extrusion profile whose substantially entire area in the longitudinal direction is made by a prescribed extruder. Both ends in the longitudinal direction of the extrusion profile are connected together to form an annular shape. The door weather strip 5 may be formed in one annular shape by connecting several different extrusion profiles together by molding portions.

Figure 2:
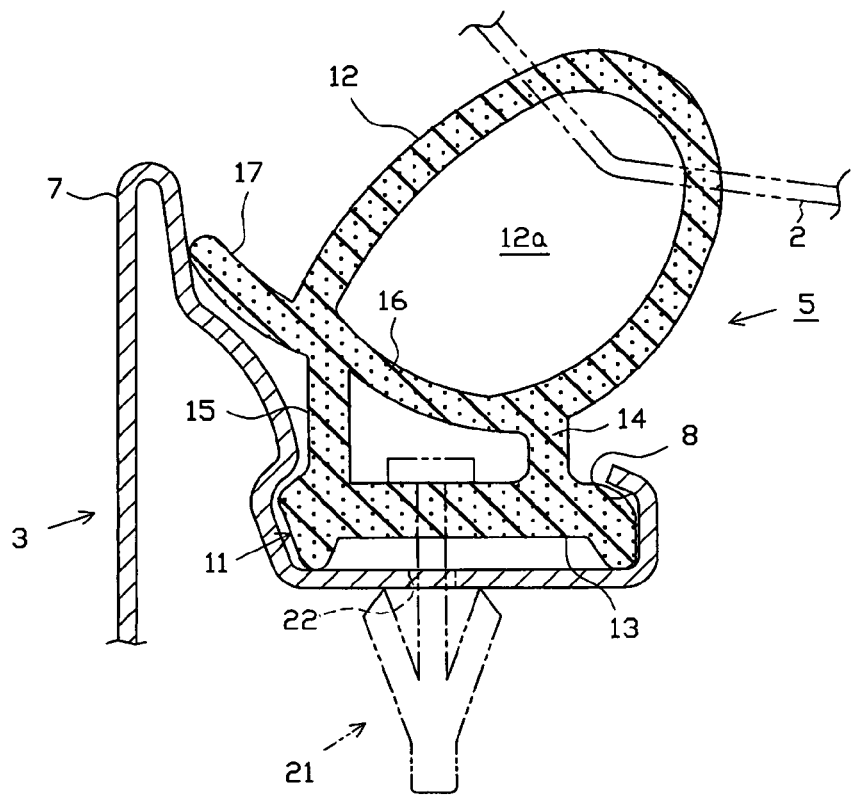
FIG. 2 is a sectional view showing a door weather strip.

As shown in FIG. 2, the door weather strip 5 includes an attaching base part 11 fitted to an attachment position 8 which is provided along an outer periphery of a door frame 7 and has a substantial C shape in section and a seal part 12 extending in the outer peripheral direction of the door 3 from the attaching base part 11. In this exemplary embodiment, the seal part 12 has a hollow part 12a (a hollow seal part) therein.

Further, the attaching base part 11 includes a base bottom part 13, a side wall part 14 extending toward vehicle inner (vehicle inner side wall part 14) and a side wall part 15 extending toward vehicle outer (vehicle outer side wall part 15) extending along the outer peripheral direction of the door 3 from the base bottom part 13 and a partition wall part 16 that connects the vehicle inner side wall part 14 to the vehicle outer side wall part 15 and partitions between the base bottom part 13 and the seal part 12.

Further, in the present exemplary embodiment, a sub-lip part 17 is provided that protrudes to a vehicle outer side from a root portion of the vehicle outer side of the seal part 12. An end part side of the sub-lip part 17 is allowed to come into contact, under pressure, with an inner surface of an extending part of the door frame 7 (a part extending toward the outer peripheral direction of the door frame 7 in the vehicle outer side of the door weather strip 5. Then, the seal part 12 is allowed to come into contact, under pressure, with the peripheral edge of the opening 2 of the vehicle body and deformed, when the door 3 is closed. Thus, the door 3 is sealed to the vehicle body.

The present exemplary embodiment expressed a door weather strip base part 11 is shown that is fitted to the substantially C shaped attachment position 8 in section (a retainer part 8). However, in attaching the attaching base part to the attachment position 8, the door weather strip can be attached on the attachment position 8, by inserting clips 21 into clip holes 22 located on the attachment position 8, the clips 21 are attached at certain intervals along the longitudinal direction of the door weather strip 5.

The door weather strip 5 in the present exemplary embodiment is made of an EPDM (ethylene-propylene-diene copolymer) sponge rubber material. More specifically, the sponge rubber material satisfies conditions that a specific gravity is 0.36 or higher and 0.44 or lower, a low stretch stress is 200 kPa or higher and 230 kPa or lower and an average foaming cell diameter is 180 μm or larger and 220 μm or smaller, and a surface roughness RzD (ten point height of irregularities) is 20 μm or higher and 37 μm or lower.

In the present exemplary embodiment, both the attaching base part 11 and the seal part 12 of the door weather strip 5 are made by an extrusion process by using the same EPDM sponge rubber material. Especially, in the present exemplary embodiment, the door weather strip 5 is made of two kinds of EPDM polymers as main components. Among those, one EPDM polymer has a relatively high molecular weight while the other EPDM polymer has a relatively low molecular weight. For example, an EPDM polymer is preferably used as the EPDM polymer of the high molecular weight which satisfies conditions that a Mooney viscosity ML1+4 (125° C.) is 100 to 180, non-conjugate diene is composed of ethylidene norbornene and dicyclopentadiene, composition ratios thereof are 6 to 12 mass % and 0.5 to 5 mass % respectively, a composition ratio of the non-conjugate diene is 8 to 12 mass % in total and Mw/Mn obtained by a GPC method is 3.0 to 4.0. While, for instance, an EPDM polymer is preferably used as the EPDM polymer of low molecular weight which satisfies conditions that a Mooney viscosity ML1+4 (125° C.) is 20 to 60, non-conjugate diene is composed of ethylidene norbornene, a content thereof is 8 to 12 mass % and Mw/Mn obtained by a GPC method is 4.0 to 6.0.

Further, in the EPDM polymer of 100 mass parts, some additives are suitably mixed in, such as 3 mass parts to 30 mass parts in total of an inorganic filter, like calcium carbonate, calcium oxide, magnesium silicate; 2.0 mass parts to 3.0 mass parts of sulfur; 4.0 to 5.0 mass parts in total of vulcanization accelerators, such as MBT (Mercapto Benzo Thiazole), ZDBC (Zinc-di-n-Butyl Dithio Carbamate), two kinds of foaming agents such as 3.0 mass parts to 6.0 mass parts of OBSH (4,4'-oxy-bis (benzene sulfonyl hydrazide)) and 0.4 mass parts to 1.9 mass parts of ADCA (azo-dicarboxylic-amide).

Both the attaching base part 11 and the seal part 12 of the door weather strip 5 are made by an extrusion process by using the same EPDM sponge rubber material with the present exemplary embodiment. Accordingly, it is possible to avoid a production device from being complicated and a cost from being increased.

Further, since the low stretch stress is 200 kPa or higher, the attaching base part 11 is not unnecessarily much deformed under an attached state, so that the attached state can be stabilized. On the other hand, as for the rigidity of the material of the seal part 12, since the low stretch stress is 230 kPa or lower, which is not very large, it allows the seal part to be adequately satisfactory to follow the deformation when the door 3 is closed and the seal part is pressed to the peripheral edge of the opening 2 of the door. As a result, a sufficient sealing property can be ensured.

Further, since the specific gravity is 0.44 or lower in the present exemplary embodiment, the door weather strip can be sufficiently lightened.

Furthermore, since the average foaming cell diameter is 220 μm or smaller, a surface skin is fine, so that the door weather strip is excellent in its durability and rigidity.

since the surface roughness RzD of 37 μm or lower is satisfied, not only the surface skin described above is fine, but also quality defect such as a water leakage and bleeding can be more securely suppressed.

EXAMPLES AND COMPARATIVE EXAMPLES

Example 1

Preparation of EPDM Compound

As the EPDM polymer of the high molecular weight, 65 mass parts of trade name ESPRENE 5527F (produced by Sumitomo Chemical Co., Ltd., ethylene composition ratio=54 mass parts, ethylidene norbornene composition ratio=8.3 mass %, dicyclopentadiene composition ratio=0.9 mass %, Mooney viscosity ML1+4 (125° C.)=120 and Mw/Mn=3.7) is used. As the EPDM polymer of the low molecular weight, 35 mass parts of trade name ESPRENE 505A (produced by Sumitomo Chemical Co., Ltd., ethylene composition ratio=54 mass parts, ethylidene norbornene composition ratio=9.5 mass %, Mooney viscosity ML1+4 (125° C.)=35 and Mw/Mn=5.5) is used. 102 mass parts of carbon blacks, 62 mass parts of process oil, filler such as 25 mass parts in total of calcium carbonate, 7 mass parts of zinc oxide, 1.5 mass parts of stearic acid, 2 mass parts of sulfur, 4.6 mass parts in total of vulcanization accelerators such as MBT, ZDBC, 3.4 mass parts of OBSH and 1.8 mass parts of ADCA are respectively mixed and kneaded to obtain an unvulcanized EPDM compound.

The EPDM compound is extruded from a rubber extruder in a sectional form having, the attaching base part and the seal part as shown in FIG. 2 as an example, passed through a two-stage heating zone including a UHF (microwave heating) chamber and an HAV (hot air heating) chamber and then vulcanized with the two-stage foaming operation to produce the door weather strip (an extrusion profile) of the present exemplary embodiment. Through this manufacturing process, the temperature of the HAV chamber is about 220° C. and a surface temperature of an extrusion profile is about 200° C. at an exit of the UHF chamber.

Comparative Example 1

Preparation of EPDM Compound 100 mass parts of trade name ESPRENE 555 (produced by Sumitomo Chemical Co., Ltd.) is used as the EPDM polymer. 102 mass parts of carbon black, 70 mass parts of process oil, 35 mass parts in total of filler such as calcium carbonate, 7 mass parts of zinc oxide, 1 mass parts of stearic acid, 0.7 mass parts of sulfur, 4 mass parts in total vulcanization accelerators such as MBT and 3 mass parts of OBSH are respectively mixed and kneaded to obtain an unvulcanized EPDM compound.

Comparative Example 2

Preparation of EPDM Compound 100 mass parts of trade name ESPRENE 555 (produced by Sumitomo Chemical Co., Ltd.) is used as the EPDM polymer. 102 mass parts of carbon black, 70 mass parts of process oil, 35 mass parts in total of filler such as calcium carbonate, 7 mass parts of zinc oxide, 1 mass parts of stearic acid, 0.7 mass parts of sulfur, 8.5 mass parts in total of vulcanization accelerators such as MBT and 7 mass parts of OBSH are respectively mixed and kneaded to obtain an unvulcanized EPDM compound.

As well as the example 1, the EPDM compounds of the comparative examples 1 and 2 are used as raw materials to extrude extrusion profiles having the same sectional forms as the example 1 by using the rubber extruder. Then, the extrusion profiles are passed through the two-stage heating zone similarly to the above-described example 1. Thus, a vulcanized door weather strip is obtained through one stage foaming operation.

<Evaluation of Door Weather Strip>

The obtained door weather strips are evaluated in various way. Evaluation results are shown in Table 1.

TABLE 1

| Material component | Name of compound {Trade name (producing maker)} | Example 1 | Comparative example 1 | Comparative example 2 |
|---|---|---|---|---|
| Polymer | EPDM{ESPRENE 555(Sumitomo Chemical co., Ltd.)} | | 100 | 100 |
| | EPDM{ESPRENE 505A(Sumitomo Chemical co., Ltd.)} | 35 | | |
| | EPDM {ESPRENE 5527F(Sumitomo Chemical co., Ltd.)} | 65 | | |
| Reinforcing material | Carbon black | 102 | 102 | 102 |
| | Process oil | 62 | 70 | 70 |
| Filler | Calcium carbonate etc | 25 | 35 | 35 |
| | Zinc oxide | 7 | 7 | 7 |
| | Stearic acid | 1.5 | 1 | 1 |

TABLE 1-continued

| Material component | Name of compound {Trade name (producing maker)} | Example 1 | Comparative example 1 | Comparative example 2 |
|---|---|---|---|---|
| Vulcanizing agent | Sulfur | 2 | 0.7 | 0.7 |
| Vulcanization accelerator | MBT etc | 4.6 | 4 | 8.5 |
| Foaming agent | OBSH | 3.4 | 3 | 7 |
|  | ADCA | 1.8 | 0 | 0 |
| Material characteristics | Specific gravity [g/cm³] | 0.39 | 0.61 | 0.5 |
|  | Low stretch stress [kPa] | 220 | 224 | 180 |
|  | Average foaming cell diameter [μm] | 210 | 240 | 300 |
|  | Surface roughness RzD [μm] | 35 | 37 | 50 |

As shown in the table 1, the features are obtained from the door weather strip of the example 1 that include the specific gravity of 0.39, the low stretch stress of 220 kPa, the average foaming cell diameter of 210 μm and the surface roughness RzD of 35 μm. This door weather strip allows the attached state stable and ensure its sufficient sealing property. The door weather strip can be adequately lightened shows excellent durability and rigidity and can effectively prevent quality defect such as a water leakage and bleeding.

On the other hand, the door weather strip of the comparative example 1 shows adequate low stretch stress, however, the specific gravity is too large, so that the door weather strip cannot satisfy the demand for weight reduction. Further, the door weather strip of the comparative example 2 is attempted to be lighter than the door weather strip of the comparative example 1, this attempt may not be satisfactory and caused remarkable decrease in the low stretch stress.

The present invention is not limited to the contents of the description of the above-described exemplary embodiment, and, for instance, the present invention may be embodied as described below. It is to be understood that other applied examples and modified examples which are not exemplified below may be embodied.

Figure 3:
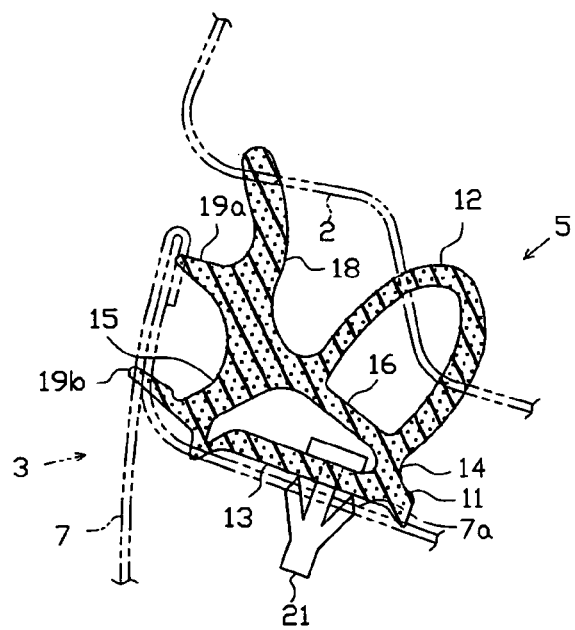
FIG. 3 is a sectional view showing a door weather strip in another exemplary embodiment.

(a) The exemplary embodiment described above, as the seal part, was subjected to only the seal part 12 having the hollow part 12a as the seal part. Comparably, as shown in FIG. 3, a door weather strip that has a seal lip 18 located outside the hollow part 12a in the vehicle can be embodied. In this case, a seal part is formed with both the seal part 12 having the hollow part 12a and the seal lip 18.

Figure 4:
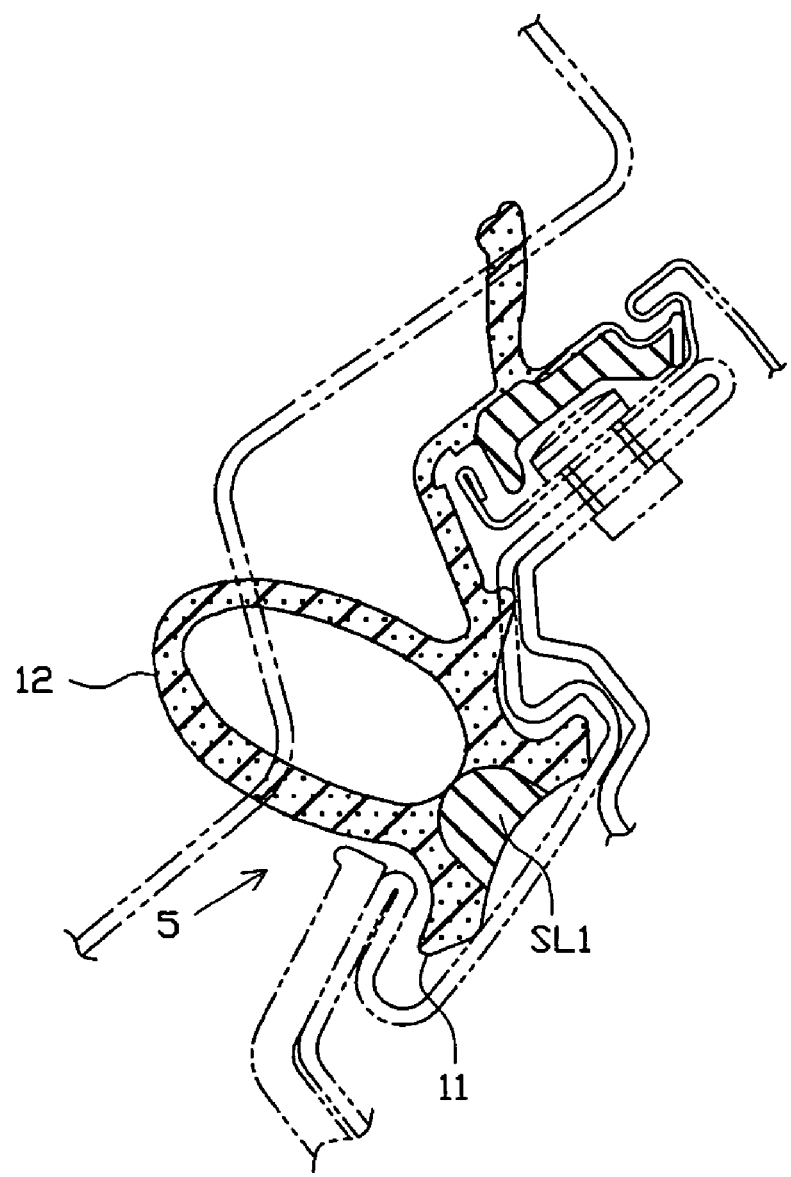
FIG. 4 is a sectional view showing a door weather strip in another exemplary embodiment.

Further, the embodiment described above is embodied that an entire part of the attaching base part 11 is made only with the EPDM sponge rubber. However, it is not subjected to exclude a door weather strip having various kinds of materials (for instance, a wire or a twist yarn or the like) embedded in the attaching base part 11 to prevent an extension. Accordingly, for instance, as shown in FIG. 4, a door weather strip provided with a solid material (SL1) in a part thereof may be embodied.

(b) The sub-lip part 17 is exemplified that protrudes toward the vehicle outer side from the root portion of the vehicle outer side of the seal part 12 in the above-described exemplary embodiment, however, a sub-lip part may be provided that extends from other part. For instance, a sub-lip part 19a can locate and protrude from an intermediate part of the seal lip 18 or a sub-lip part 19b that extends from the attaching base part 11 may be provided as shown in FIG. 3.

(c) construction was exemplified to attach the door weather strip to the attachment position 8, the attaching base part is fitted to the retainer whose section is substantially C shaped in the above-described exemplary embodiment. As another example, the attaching base part is fitted to the attachment position 8 by the clip 21. However, a retainer having a substantially C shaped section is not necessarily essential as shown in FIG. 3. Further, in this case, a door weather strip may be fitted to a peripheral wall surface 7a of a door frame 7 by a double side adhesive tape instead of the clip 21, or in addition to the clip 21.

(d) In the above-described exemplary embodiment, the door weather strip 5 of the front door is embodied, however, a position of the door to which the door weather strip is attached is not especially limited. For instance, a door weather strip attached to a rear door may be embodied.

What is claimed is:

1. A door weather strip, comprising:
    an attaching base part that is fitted to an attachment position of a peripheral edge of a door for a vehicle; and
    a seal part that is extended along an outer periphery of the door from the attaching base part and is allowed to come into contact with a peripheral edge of an opening of the door of a vehicle main body under pressure when the door is closed,
    wherein both the attaching base part and the seal part comprise the same composition of an EPDM (ethylene-propylene-diene copolymer) sponge rubber material,
    wherein the door weather strip includes a specific gravity in a range from 0.36 to 0.44, inclusive, a stretch stress in a range from 200 kPa to 230 kPa, inclusive, and an average foaming cell diameter in a range from 180 μm to 220 μm, inclusive,
    wherein the EPDM sponge rubber material comprises a first EPDM polymer and a second EPDM polymer having a molecular weight less than a molecular weight of the first EPDM polymer, and
    wherein the first EPDM polymer includes a Mooney viscosity ML1+4 (125° C.) of 100 to 180 and the second EPDM polymer includes the Mooney viscosity ML1+4 (125° C.) of 20 to 60.

2. A door weather strip according to the claim 1, wherein the EPDM sponge rubber material has a surface roughness RzD (ten point height of irregularities) in a range from 20 μm to 37 μm.

3. A door weather strip according to the claim 1, wherein the first EPDM polymer comprises a non-conjugate diene comprising ethylidene norbornene and dicyclopentadiene with composition ratios of 6 to 12 mass % and 0.5 to 5 mass %, respectively, a composition ratio of the non-conjugate diene being 8 to 12 mass % in a total of the first EPDM polymer.

4. A door weather strip according to the claim 1, wherein the first EPDM polymer has an Mw/Mn obtained by a GPC method in a range from 3.0 to 4.0.

5. A door weather strip according to the claim 1, wherein the second EPDM polymer comprises a non-conjugate diene comprising ethylidene norbornene with a content in a range from 8 mass % to 12 mass %.

6. A door weather strip according to the claim 1, wherein the second EPDM polymer has an Mw/Mn obtained by a GPC method in a range from 4.0 to 6.0.

7. A door weather strip according to the claim 1, wherein the EPDM sponge rubber material of 100 mass parts is mixed with additives including 3 mass parts to 30 mass parts in total of an inorganic filler, 2.0 mass parts to 3.0 mass parts of sulfur, 4.0 mass parts to 5.0 mass parts in total of vulcanization accelerators, and foaming agents including 3.0 mass parts to 6.0 mass parts of OBSH (4,4'-oxy-bis (benzene sulfonyl hydrazide)) and 0.4 mass parts to 1.9 mass parts of ADCA (azo-dicarboxylic-amide).

8. A door weather strip according to the claim 7, wherein the inorganic filler comprises one of calcium carbonate, calcium oxide, and magnesium silicate.

9. A door weather strip according to the claim 7, wherein the vulcanization accelerators comprise one of MBT (Mercapto Benzo Thiazole) and ZDBC (Zinc-di-n-Butyl Dithio Carbamate).

* * * * *